United States Patent [19]
Bauer et al.

[11] Patent Number: 5,575,596
[45] Date of Patent: Nov. 19, 1996

[54] CLOSURE DEVICE FOR A CONVEYING UNIT OPERATING IN A VACUUM

[75] Inventors: Michael Bauer, Waiblingen; Otto Brandauer, Muehlacker; Dieter Kemmler, Ludwigsburg, all of Germany

[73] Assignee: Filterwerk Mann & Hummel GmbH, Ludwigsburg, Germany

[21] Appl. No.: 408,890

[22] Filed: Mar. 24, 1995

[30] Foreign Application Priority Data

Mar. 24, 1994 [DE] Germany ................... 44 10 087.6

[51] Int. Cl.⁶ ................................................. B65G 53/46
[52] U.S. Cl. ........................ 406/168; 406/173; 406/132
[58] Field of Search .................................... 406/168, 173, 406/132; 251/318

[56] References Cited

U.S. PATENT DOCUMENTS

| | | | |
|---|---|---|---|
| 1,890,562 | 12/1932 | Clute | 406/168 |
| 3,423,130 | 1/1969 | Milner | 406/168 |
| 3,776,600 | 12/1973 | McLeod | 406/168 |

FOREIGN PATENT DOCUMENTS

| | | |
|---|---|---|
| 2524821 | 10/1983 | France . |
| 616592 | 8/1935 | Germany . |
| 1175152 | 7/1964 | Germany . |
| 1246553 | 8/1967 | Germany . |
| 2304336 | 8/1974 | Germany . |
| 3406824 | 8/1985 | Germany . |
| 3901110 | 7/1990 | Germany . |
| 146066 | 3/1931 | Switzerland . |
| 1433954 | 4/1976 | United Kingdom . |
| 2117277 | 10/1983 | United Kingdom . |
| 2166068 | 4/1986 | United Kingdom . |

*Primary Examiner*—Gary C. Hoge
*Attorney, Agent, or Firm*—Evenson, McKeown, Edwards & Lenahan P.L.L.C.

[57] ABSTRACT

A closure device for the discharge outlet of a bulk material conveying unit which operates under vacuum. The outlet has a circular cross-section, and the outlet opening of the conveying unit is closed by means of a freely movable closure element, particularly a ball. The closing effect is achieved by means of a vacuum in the conveying unit. In the open position, i.e. after the vacuum is switched off, the ball moves downward and rests on a supporting device and thereby forms an annular discharge outlet cross-section which is interrupted only by the struts of the supporting device.

10 Claims, 1 Drawing Sheet

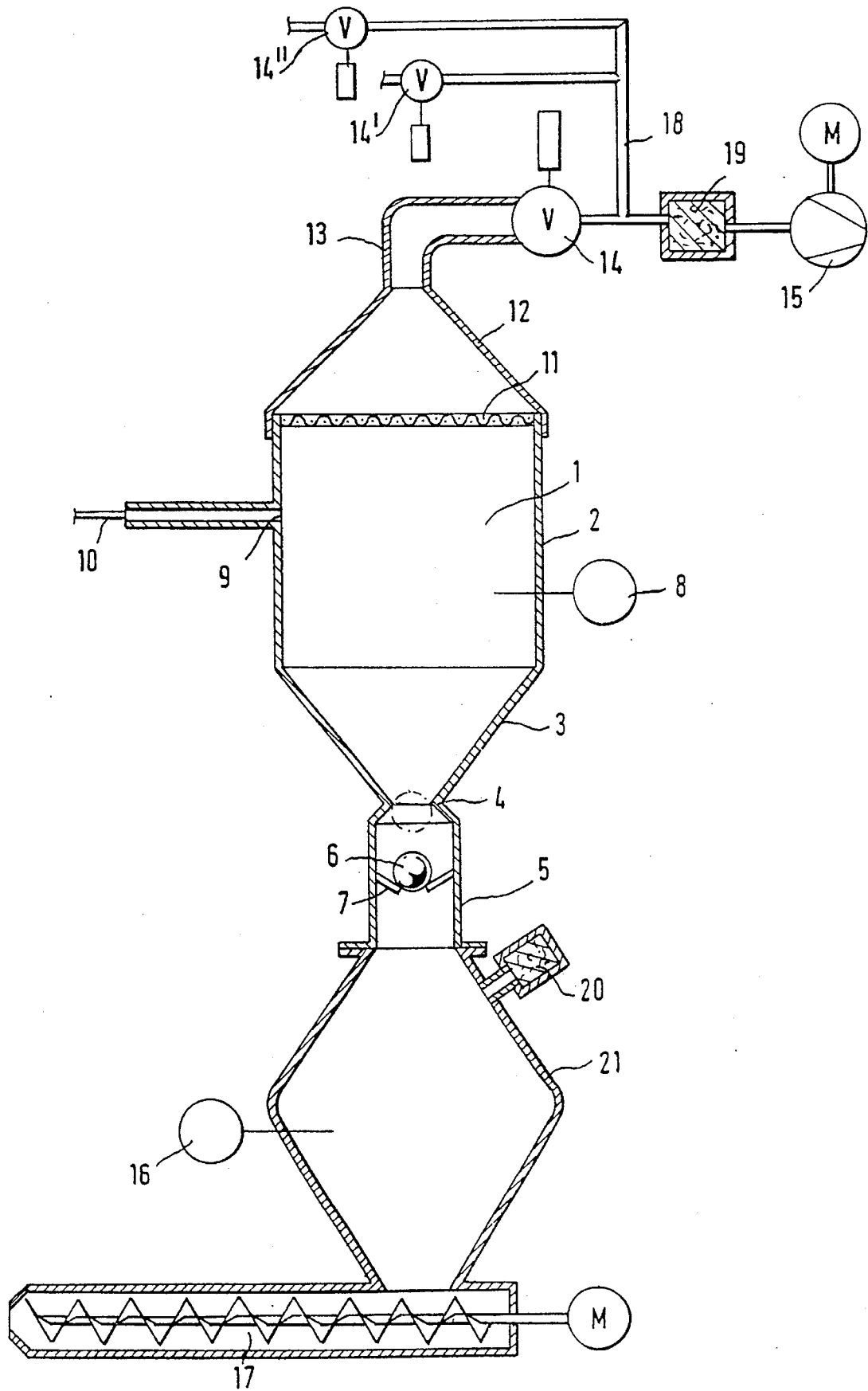

CLOSURE DEVICE FOR A CONVEYING UNIT OPERATING IN A VACUUM

BACKGROUND OF THE INVENTION

This invention relates to a closure device for a vacuum conveying unit which operates under a vacuum, i.e. under reduced pressure, and which has a circular outlet.

This type of a conveying unit is known, for example, from the brochure of Mann+Hummel GmbH, VKD 287.2 D, and is used for conveying plastic granules. This conveying unit operates by means of a suction blower. The plastic granules are conveyed into the unit from a container by means of the vacuum. After the expiration of a set conveying time, the suction blower will switch off. The material to be conveyed situated in the conveying unit presses open a flap, which is arranged over the conveyor outlet, and flows out of the conveying unit. After the material to be conveyed has flowed out, a counterweight urges the flap into the closed position and the suction operation starts again.

Published German Patent Application No. DE 3,406,824 discloses a bell-shaped valve for blocking an outlet. This bell-shaped valve is used particularly where very abrasive media are processed. So that no abrasion will occur on the bell-shaped valve and the other mechanical components of the valve, a protective sleeve is provided which rests against a guide body. Instead of rotary flaps or bell-shaped valves, ball valves or squeeze valves may also be used. These can be actuated electro-pneumatically.

A special problem presented by plastic processing machines is represented by cable sheathing extruders for producing cables of cross-linked polyethylene (PE). These cables are used exclusively in the high-voltage range of up to 440 KV. In this case, not only must the PE-insulating layer have a certain minimum thickness for the insulation, but its material must also be extremely pure. Because of a long-term effect, even traces of impurities of a magnitude of 40 μm may impair the insulation of the cable and result in a breakdown. For this reason, all parts which come in contact with the cable sheathing material are without exception made of special steel with an electrolytically polished surface so that no abrasion or impurities can arrive in the insulating mass. Since this polyethylene is a cross-linkable material, one part peroxide, which is required for the cross-linking, is added to the polyethylene. This peroxide has the unpleasant characteristic that it separates from the granules and adheres to dead corners of an aggregate, ages there and, when detached in the extrudate, leads to a reduction in quality. For this reason, the aggregates for the transport and handling of this material, in addition to having an absolutely non-rusting, highly-polished surface, must be designed in such a shape that they have no dead corners.

Conventional closure devices for conveying units have not provided a satisfactory solution in this regard because any type of moved flap causes the slightest metallic abrasion and because it has not been possible no design a flap closure device without dead spaces.

Thus there has remained a need in the art for a closure device for a vacuum conveyor which would eliminate these disadvantages.

SUMMARY OF THE INVENTION

It is therefore an object of the invention to provide a closure device which avoids the aforementioned disadvantages of the prior art.

It is also an object of the invention to provide a closure device for a vacuum conveyor which can be manufactured at reasonable cost.

Yet another object of the invention is to provide a closure device for a vacuum conveyor which does not cause abrasion which would adversely affect its usefulness.

These and other objects of the invention are achieved by providing a closure device for a discharge outlet of a vacuum conveyor for bulk material, wherein the outlet has a circular cross-section, the closure device comprises a freely movable body provided under the circular outlet and a support provided under the freely movable body, the freely movable body rests on the support in a first position spaced away from the outlet so that the outlet is open when the vacuum conveyor is deactivated, and the freely movable body being drawn by vacuum into a second position against the outlet to close the outlet when the vacuum conveyor is activated to convey the bulk material.

The closure device according to the invention has the advantage that it is completely free of dead spaces because the material being discharged flows around all interior sides of the discharge outlet device and the ball itself and so that it is impossible for caking to occur. Furthermore, no metallic abrasion is caused because only contact pressure forces take place and there is no friction or relative movement between the individual metal surfaces.

In an advantageous further embodiment of the invention the closure member, for example a ball, is made of the same material as the granules to be conveyed so that, when electrostatic charges occur as a result of friction, both materials will then have the same charge and repel one another.

This arrangement effectively eliminates the disadvantages of conventional conveying units in a simple manner.

According to an advantageous further embodiment of the invention, the freely movable closure element is designed as a ball. A ball has the advantage that it reliably closes off a circular opening in any position. It is, of course, also possible to use other closure elements, such as a cone or a flat or curved plate. These closure elements also assure that the discharge will be securely closed.

An important optional feature is the freely movable closure device. Guides of any type which move this closure device into the open or into the closed position are not required. To this extent that the guides are eliminated, there is also no friction between the two end positions.

In another advantageous further embodiment of the invention, the cross-section of the discharge has a point-symmetric design and has no surfaces without any flow. This assures that the material can be discharged completely from the container.

In accordance with a further embodiment of the invention, the ball consists of the same material as the bulk material to be conveyed; that is the ball is formed of the same material as the plastic granules to be conveyed. This has the advantage that, when electrostatic charges occur because of the friction of the two materials, the bulk material and the ball will have the same charge and repel one another.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to an illustrative preferred embodiment shown in the accompanying drawing in which:

The figure is a schematic representation of an apparatus incorporating a closure device according to the present invention.

DETAILED DESCRIPTION OF PREFERRED EMBODIMENTS

The accompanying drawing figure shows a bulk material conveying unit which has a ball-type closure device. The conveying unit 1 comprises a cylindrical shell 2 and a conical discharge funnel 3. The conical discharge funnel 3 ends in a discharge opening 4 and represents the narrowest cross-section of the discharge duct 5. In the cylindrical discharge conduit 5, a ball 6 is situated which, in the inoperative condition, rests on a supporting device 7. In the illustrated embodiment, the supporting device takes the form of a supporting cross of four radially inwardly projecting struts. As shown in the drawing, these struts may extend only partially across the discharge conduit 5 with inward ends spaced at a distance from one another. Furthermore, the conveying station is equipped with a material supply level reporting device 8 and has an inlet 9 into which the material enters by way of a transfer duct 10, coming from the storage container.

A large sieve 11 is disposed in the upper part of the conveying unit. A removable lid 12 is arranged above this sieve 11. A clean-air opening 13, which can be closed off by means of a discharge valve 14, is situated in lid 12. Several conveying stations, which are not shown here, may be locked on to a conveying blower 15 by way of additional valves 14' and 14". Underneath the conveying unit, a machine hopper 21 is situated which is equipped with another feeding-level reporting device 16 and is constructed directly on the processing machine 17. For separating superfine particles, a filter 19 is installed in the pure-air pipe 18. Another filter 20 is situated on the hopper of the processing machine so that, for the purpose of a pressure compensation, atmospheric air can flow into the hopper.

The conveying system is activated by a control, specifically in that, when the feeding-level reporting device 16 responds, the discharge valve 14 is opened up and the conveying blower 15 starts to run. As a result, an air flow is generated which, on the one hand, has the effect that material from the storage container is sucked into the conveying unit and, on the other hand, that the ball 6 is lifted by the starting flow (position indicated by a broken line) and is pressed against the outlet 4 in a tightly closing manner. This provides the condition that a feeding of the conveying unit is carried out until the feeding-level report device 8 responds. Then the flap 14 is closed; the blower 15 is switched off; or, if required, by way of 14' or 14", the next conveying unit to be fed is locked on. By means of the closing of the flap 14, an atmospheric pressure will occur in the conveying unit because of the afterflowing air by way of the conveying pipe so that the dead weight of the charged granules and the dead weight of the ball itself open up the opening 4, and the material can flow out into the extruder hopper.

This sequence is constantly repeated so that the processing machine is sufficiently supplied with material at any time.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closure device for a discharge outlet of a vacuum conveyor for bulk material, wherein said outlet has a circular cross-section, said closure device comprising a freely movable ball provided under said circular outlet, and a support provided under said freely movable ball, said freely movable ball resting on said support in a first position spaced away from said outlet so that said outlet is open when the vacuum conveyor is deactivated, said freely movable ball being drawn by vacuum into a second position against said outlet to close said outlet when the vacuum conveyor is activated to convey said bulk material, and said freely movable ball being formed of material having a composition identical to said bulk material conveyed by the vacuum conveyor.

2. A closure device according to claim 1, wherein said freely movable body is a ball.

3. A closure device according to claim 1, wherein said ball moves without friction between said first position and said second position.

4. A closure device according to claim 1, wherein said supporting device comprises a plurality of radially-inwardly projecting struts in a circular discharge conduit underneath said outlet.

5. A closure device according is claim 1, wherein when the freely movable ball rests on the supporting device, the supporting device centers the freely movable ball in said circular discharge conduit so that an annular discharge passageway is formed which is interrupted only by the supporting device.

6. A closure device according to claim 1, wherein said outlet is formed at the bottom of a radially symmetrical converging hopper.

7. A closure device according to claim 6, wherein said radially symmetrical converging hopper has the form of a circular discharge funnel.

8. A closure device according to claim 1, wherein said bulk material is a plastic material.

9. A closure device for a discharge outlet of a vacuum conveyor for bulk material, wherein said outlet has a circular cross-section, said closure device comprising a freely movable ball provided under said circular outlet, and a support provided under said freely movable ball, said freely movable ball resting on said support in a first position spaced away from said outlet so that said outlet is open when the vacuum conveyor is deactivated, said freely movable ball being drawn by vacuum into a second position against said outlet to close said outlet when the vacuum conveyor is activated to convey said bulk material, and said support comprising a plurality of radially-inwardly projecting struts in a circular discharge conduit underneath said outlet with radially inward ends of said struts being spaced at a distance from one another.

10. A closure device according to claim 9, wherein said freely movable ball is formed of material having a composition identical to the bulk material conveyed by the vacuum conveyor.

\* \* \* \* \*